Jan. 15, 1929.

E. P. DU PONT 1,698,720

SPEED REDUCTION GEARING

Filed Sept. 10, 1927

WITNESS:
Rob: P. Kitchel.

INVENTOR
Eleuthere Paul du Pont
BY
Busser & Harding
ATTORNEYS.

Patented Jan. 15, 1929.

1,698,720

UNITED STATES PATENT OFFICE.

ELEUTHERE PAUL DU PONT, OF MONTCHANIN, DELAWARE.

SPEED-REDUCTION GEARING.

Application filed September 10, 1927. Serial No. 218,626.

My invention relates to power transmission gearing and has for its purpose to reduce the speed between a driving shaft and a driven shaft. A more especial object is to provide reduction gearing that will operate quietly, avoid the necessity for bearings between the two shafts and provide a compact and simple unit of minimum length. Another object of the invention is to so construct the gearing that it may be rendered operative as a speed reduction gearing or may be rendered inoperative when the driven shaft is locked to the driving shaft.

The invention is especially adapted to automobile transmissions and its preferred location is between the clutch-controlled driving shaft and the shaft that connects with the regular multiple-gear transmission, although it may be arranged to be applied at any other point between the motor and rear axle.

The invention is an improvement on speed reduction gearing forming the subject-matter of an application filed by me June 24, 1927, Serial No. 201,051.

In the drawings, which show a preferred embodiment of the invention and also one preferred application thereof to an automobile transmission—

The driving shaft $a$ and the driven shaft $b$ are held in alignment by means of two aligning bearings carried by eccentrics $i$ and $j$ fixed to, and projecting inward from the ends of, a fixed housing $h$. Driving shaft $a$ is slidable in the direction of its axis.

Figure 2:
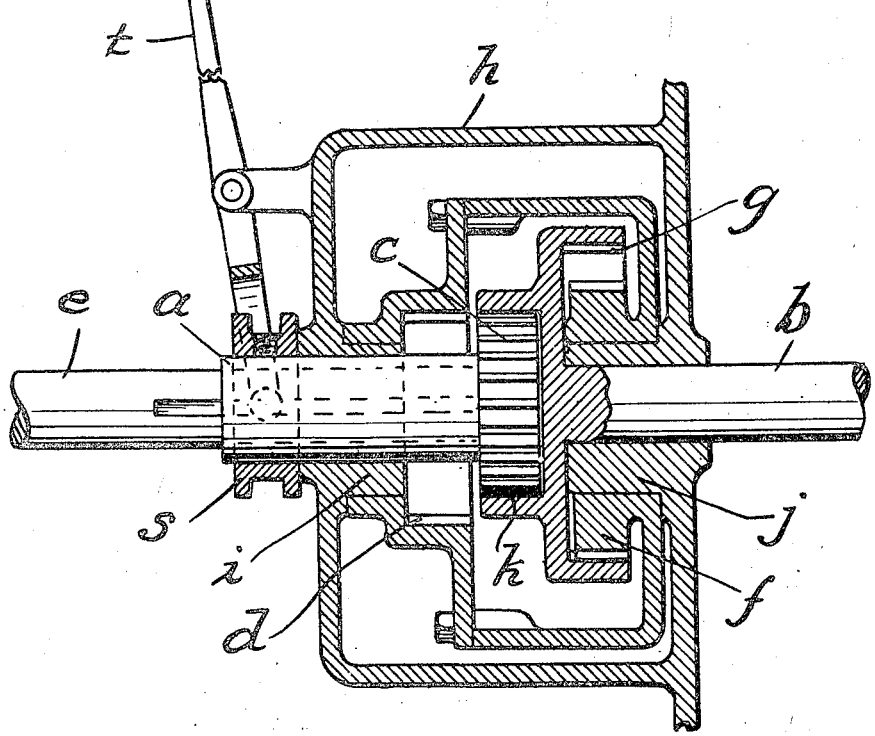
Fig. 2 is a longitudinal sectional view of reduction gearing embodying the invention.

Shaft $a$ carries a pinion $c$. Shaft $b$ carries an internal gear $g$ and teeth $k$ adapted to be engaged by piston $c$ when the latter is moved to the right, Fig. 2.

An intermediate rotary member spans the ends of shaft $a$ and $b$. This member comprises an internal gear $d$, adapted to be engaged by pinion $c$ when the latter is moved to the left, Fig. 2, and a pinion $f$, which meshes with internal gear $g$ on shaft $b$. This rotary member, $d, f$, is mounted to turn on the eccentric bearings $i$ and $j$.

Figure 1:
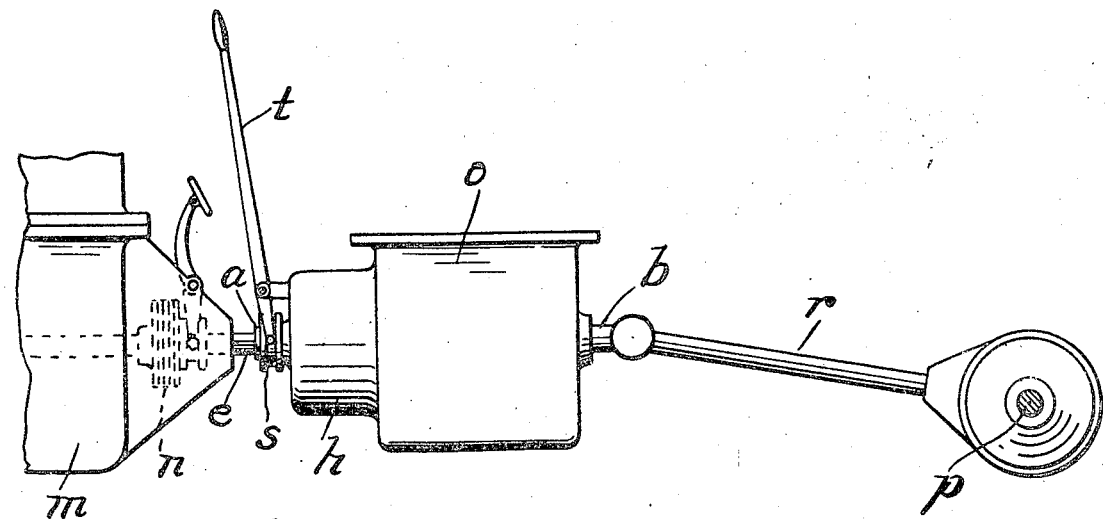
Fig. 1 is an elevational view showing the invention applied to an automobile transmission.

Slidable shaft $a$ is preferably formed as a sleeve splined on a shaft $e$. In Fig. 1 are shown a clutch $n$ for connecting the shaft of motor $m$ to shaft $e$, and a housing $o$ for a regular three-speed gear transmission (which may be connected to the rear axle $p$ by the usual connections $r$).

By means of a grooved collar $s$ fixed on shaft $a$ and a hand lever $t$ pivoted on housing $h$ and engaging said collar, shaft $a$ may be moved either to the left to bring pinion $c$ into driving engagement with internal gear $d$, or to the right to bring pinion $c$ into driving engagement with the teeth $k$ on gear $g$.

When shaft $a$ is moved to the left so as to engage pinion $c$ with internal gear $d$, pinion $c$ drives internal gear $d$ and pinion $f$ drives internal gear $g$, and shaft $b$ is driven at a reduced speed. That is, internal gear $d$, being of greater diameter than pinion $c$ (carried by shaft $a$) will be driven at a lower speed than shaft $a$; and pinion $f$ (turning with internal gear $d$), being of smaller diameter than internal gear $g$ (carried by shaft $b$), will drive shaft $b$ at a still lower speed.

When shaft $a$ is moved to the right so as to disengage pinion $c$ from internal gear $d$ and fixedly connect shafts $a$ and $b$, the train of gearing $d, f, g$, becomes inoperative to drive shaft $b$. Instead, internal gear $g$ drives the rotary member $f, d$, at a higher speed, but the rotary member then acts as an idler.

When my improved train of gears is incorporated in an automobile drive, as shown in Fig. 1, it will give, obviously besides the normal three speeds of the automobile, three additional speeds.

Internal gears run much more quietly than spur gears. Further, my arrangement of internal gears does not lengthen the lay-out as much as other arrangements of internal gears that require bearing in between the driving and driven shafts. The unit is simple as well as compact.

The speed reduction gearing herein set forth has a slightly longer lay-out than the specific construction shown in my earlier application, but it is of advantage thereover in that the housing is not rotatable.

Having now fully described my invention, what I claim and desire to protect by Letters Patent is:

1. Speed reduction gearing comprising a driving shaft and a driven shaft, eccentrics in which said shafts are turnable, a pinion turning with one shaft, an internal gear turnable with the other shaft, an intermediate rotary member sleeved on said eccentrics and comprising a pinion in operative engagement with said internal gear and an internal gear, and means to engage the first named pinion with the second named internal gear, or, alternatively to disconnect the first named pinion from the second named internal gear and key one shaft to the other.

2. Speed reduction gearing comprising a driving shaft and a driven shaft, eccentrics in which said shafts are turnable, a pinion turning with one shaft, an internal gear turnable with the other shaft and provided with teeth adapted to be engaged by said pinion, an intermediate rotary member sleeved on said eccentrics and comprising a pinion in operative engagement with said internal gear and an internal gear adapted to be engaged by the first named pinion, and means to engage the first named pinion with the second named internal gear and disengage the first named pinion from said teeth, or, alternatively, engage the first named pinion with said teeth and disengage the first named pinion from the second named internal gear.

3. Speed reduction gearing comprising a driving shaft and a driven shaft, one of said shafts being slidable in the direction of its axis, eccentrics in which said shafts are turnable, a pinion turning with the slidable shaft, an internal gear turnable with the other shaft and provided with teeth adapted to be engaged by said pinion, an intermediate rotary member sleeved on said eccentrics and comprising a pinion in operative engagement with said internal gear and an internal gear adapted to be engaged by the first named pinion, and means to slide said slidable shaft in one direction to engage the first named pinion with the second named internal gear and disengage the first named pinion from said teeth, and in the other direction to reverse said connections.

4. Speed reduction gearing comprising a driving shaft and a driven shaft aligned therewith, fixed eccentrics in which the respective shafts turn, an intermediate rotary member sleeved on the eccentrics and spanning the two shafts, said member comprising an internal gear and a pinion, a pinion turning with one shaft, an iternal gear turning with the other shaft and in operative engagement with the first named pinion, a fixed housing carrying said eccentrics and enclosing the aligning ends of said shafts and the specified intermediate driving mechanism, and means to engage the last named pinion with the first named internal gear so as to drive one shaft from the other through the medium of the intermediate driving connections specified, or, alternatively, to disconnect the last named pinion from the first named internal gear and bring said shafts into direct driving engagement.

In testimony of which invention, I have hereunto set my hand, at Wilmington, Del., on this 25th day of August, 1927.

ELEUTHERE PAUL du PONT.